United States Patent
Ogman et al.

(10) Patent No.: US 7,127,239 B2
(45) Date of Patent: Oct. 24, 2006

(54) SYSTEM AND METHOD FOR SHARING CELLULAR COMMUNICATION SERVICES AMONG MOBILE STATIONS OF DIFFERENT NETWORKS

(75) Inventors: Lipa Ogman, Reut (IL); Arza Steinmetz, Tel Aviv (IL); Alon Nurel, Modi'in (IL); Dmitry Gitlin, Tel Aviv (IL); Haim Rokach, Bat Yam (IL); Giora Josua, Katzir (IL)

(73) Assignee: Cellcom Israel Limited, Herzliya (IL)

( * ) Notice: Subject to any disclaimer, the term of this patent is extended or adjusted under 35 U.S.C. 154(b) by 376 days.

(21) Appl. No.: 10/151,113

(22) Filed: May 21, 2002

(65) Prior Publication Data

US 2003/0186676 A1   Oct. 2, 2003

(30) Foreign Application Priority Data

Mar. 27, 2002 (IL) ..................................... 148926

(51) Int. Cl.
*H04Q 7/20* (2006.01)
(52) U.S. Cl. ..................... 455/417; 455/414.1; 455/445
(58) Field of Classification Search ................ 455/403, 455/415, 414.1, 417, 422.1, 445, 426.1, 432.1, 455/433, 517, 458, 552.1, 436; 379/283, 379/216.01, 355.01; 370/328, 335, 342, 370/331

See application file for complete search history.

(56) References Cited

U.S. PATENT DOCUMENTS

| | | | | |
|---|---|---|---|---|
| 5,819,176 A * | 10/1998 | Rast | ........................ | 455/422.1 |
| 6,259,782 B1 * | 7/2001 | Gallant | .................. | 379/211.01 |
| 6,311,063 B1 * | 10/2001 | Valliani et al. | ............. | 455/433 |
| 6,408,173 B1 * | 6/2002 | Bertrand et al. | ............ | 455/406 |
| 6,587,688 B1 * | 7/2003 | Chambers et al. | .......... | 455/433 |
| 6,662,006 B1 * | 12/2003 | Glass | .......................... | 455/415 |
| 6,792,095 B1 * | 9/2004 | Frank | ..................... | 379/216.01 |
| 6,912,230 B1 * | 6/2005 | Salkini et al. | .............. | 370/466 |
| 2001/0031645 A1 * | 10/2001 | Jarrett | ........................ | 455/552 |
| 2002/0006808 A1 * | 1/2002 | Onaka et al. | ............... | 455/550 |
| 2002/0012351 A1 | 1/2002 | Sofer et al. | | |
| 2002/0077129 A1 * | 6/2002 | Kikuta et al. | ................ | 455/461 |
| 2002/0090927 A1 * | 7/2002 | Allande et al. | ............. | 455/408 |
| 2002/0094811 A1 * | 7/2002 | Bright et al. | ................ | 455/433 |
| 2003/0125072 A1 * | 7/2003 | Dent | ........................... | 455/551 |

(Continued)

FOREIGN PATENT DOCUMENTS

EP    0 738 093 A    10/1996

(Continued)

*Primary Examiner*—Jean Gelin
(74) *Attorney, Agent, or Firm*—Birch, Stewart, Kolasch & Birch, LLP

(57) ABSTRACT

A system and method for configuring two different wireless multi-protocol communication networks so that a common telephone number may be shared between telephones communicating over the different networks. Telephone number transparency is provided so that at the subscriber level, both telephones appear to have the same number and can access common subscriber services associated with that number in a substantially identical fashion. An incoming call is first directed to the telephone designated as the "primary telephone", and then to the telephone designated as the "secondary telephone" if the telephone is not answered. Although the telephones are associated with the same number, they are able to simultaneously conduct independent communications and may establish a communication link between each other. This arrangement may be put to advantage by a service provider who wishes to migrate a subscriber base from one network technology to another, such as from a TDMA network to a GSM network.

58 Claims, 6 Drawing Sheets

U.S. PATENT DOCUMENTS

2005/0261021 A1* 11/2005 Hallenstal et al. ....... 455/552.1

FOREIGN PATENT DOCUMENTS

| WO | WO 94/17644 A1 | 8/1994 |
| WO | WO 98/26626 A2 | 6/1998 |
| WO | WO 99/57914 A2 | 11/1999 |
| WO | WO 02/05528 A2 | 1/2002 |

* cited by examiner

SYSTEM AND METHOD FOR SHARING CELLULAR COMMUNICATION SERVICES AMONG MOBILE STATIONS OF DIFFERENT NETWORKS

The present application claims priority from Israel Patent Application No. 148926 of Mar. 27, 2002 and is therefore incorporated herein.

FIELD OF THE INVENTION

The present invention relates to wireless cellular communication and, more particularly, to a system and method for simultaneously and transparently sharing a single telephone number and services associated therewith between two distinct cellular telephones communicating over two distinct cellular networks employing different protocols.

BACKGROUND OF THE INVENTION

A result of the continuing evolution in technologies for cellular telephony is that it is possible for several different technologies to coexist and overlap to varying degrees within a given subscriber market. Because these different technologies and the networks based thereon have different characteristics and operational considerations, certain incompatibilities may arise between the networks that limit the abilities of Service Providers to offer associated services to the subscribers.

As an illustration of the above concern, consider, as a non-limiting example shown conceptually in FIG. 1, the case of a Subscriber who initially obtained two cellular telephones from a Service Provider operating a single-protocol TDMA (Time Division Multiple Access) network 101. A telephone 103 set up for hands-free operation is installed in the Subscriber's car, whereas another telephone 105 is a smaller and more compact unit which the Subscriber carries on his person. Both telephones 103 and 105 are configured within TDMA network 101 to have a common telephone number 107, wherein telephone 105 is designated as the "primary" telephone. An incoming call 111 to common number 107 is thus routed first to telephone 105. If, however, telephone 105 is not reachable, is busy, or is not answered, incoming call 111 is then automatically routed to telephone 103, which is designated as the "secondary telephone". In this fashion, the Subscriber receives the call on the appropriate telephone regardless of his location. In addition, both telephone 103 and telephone 105 identify themselves in the same way to network 101, so the Subscriber can utilize them in a completely interchangeable fashion to access so the Subscriber can utilize them in a completely interchangeable fashion to access one or more common Subscriber services 109 (such as voice-mail). The term "common Subscriber service" herein denotes ancillary services (including, but not limited to voice mail notifications, e-mail, Internet access, caller ID, unified billing, voice-activated dialing, and virtual private network) which are available in substantially identical form via both telephones. As far network 101 is concerned, both telephone 103 and telephone 105 are physically distinct at the device level, so that primary telephone 105 may be readily distinguished from secondary telephone 103 for the purpose of making cellular connections. At the service level, however, network 101 can treat telephone 103 as substantially identical to telephone 105, because they have the same CLI (Calling Line Identity), so that from the Subscriber's viewpoint, it makes absolutely no difference whether he uses telephone 103 or telephone 105 to access one or more common Subscriber services 109, which are associated with common telephone number 107. Equivalence of this kind (where telephone 103 can be used interchangeably with telephone 105 both to send and receive calls associated with the same telephone number as origination and destination, respectively), is herein denoted by the term "substantially identical". The term "substantially identical" is also used herein with reference to accessing common Subscriber services, denoting that the Subscriber interface associated with each telephone appears substantially the same to the Subscriber. As a non-limiting example of this, the procedures, codes, or keystrokes a Subscriber would employ to access his voice-mail box would be substantially the same regardless of which telephone he used to perform the access.

Because both telephone 103 and telephone 105 communicate over the same TDMA network 101, the above arrangement, which is of benefit to the Subscriber, is relatively straightforward to implement, and is known in the prior art.

It is noted that there are operational differences between the case whereby two telephones share a common telephone number and the case of "call forwarding", whereby a telephone call to a first telephone having a first telephone number is redirected to a second telephone having a second (and different) telephone number. Superficially, in the call forwarding case, it could appear to the caller as if the second telephone, which has received a call intended for the first telephone, would have the same telephone number as the first telephone. In call-forwarding, however, only incoming telephone calls exhibit this property. An outgoing call made from the second telephone would be associated with the second telephone number, not the telephone number of the first telephone. From this standpoint, call forwarding per se does not produce a situation whereby both telephones truly share a common telephone number. In addition, the second telephone will still respond to calls directed to the second telephone number. Moreover, call forwarding operates either in strict sequence (initially paging the first telephone and thereafter paging the second telephone) or in an override mode (where only the second telephone is paged and the first telephone is bypassed). Sharing a common telephone number, on the other hand, can also operate in a simultaneous paging mode whereby both telephones are paged at the same time. Furthermore, call forwarding is usually implemented on a case-by-case basis, and often requires the interaction and attention of the Subscriber (to initiate and cancel call forwarding). Call-forwarding techniques can be used in combination with other techniques to effect the sharing of a common telephone number between two telephones, but additional capabilities are needed to provide all the relevant characteristics of true sharing as opposed to mere call-forwarding.]

To continue with the above illustration, suppose that, at a later time, the Service Provider begins operating a single-protocol GSM (Global System for Mobile Communications) network in addition to the original single-protocol TDMA network, which continues in operation to support the existing TDMA telephones. Although both TDMA and the GSM communication networks are considered to be at the same "second-generation" level, there may be various reasons for the Service Provider to desire to expand service into the GSM area. For example, the advanced GPRS (General Packet Radio Service) for higher-speed data communications is layered on GSM protocols. In addition, GSM is a de facto standard in the European and Asian markets, and Service Providers in other regions may wish to migrate in that direction as well.

FIG. 2 conceptually illustrates what happens when the Subscriber of this example wishes to obtain a GSM telephone to replace telephone 105 (FIG. 1), which he carries on his person. TDMA telephone 103 installed in his car, however, is still perfectly suitable to the Subscriber, and to avoid the cost and inconvenience of having to obtain and install a new telephone in his car, the Subscriber also wishes to retain TDMA telephone 103, which is already installed therein. The Subscriber thus obtains a single-protocol GSM telephone 205.

Unfortunately for the Subscriber, however, GSM telephone 205, which he now carries on his person, communicates over a network 201, which is distinct from network 101 within which communicates telephone 103. Even though network 101 and network 201 are both operated by the same Service Provider, they are not compatible with one another because they are both single-protocol networks based on different protocols. Two single-protocol networks which operate according to different protocols are herein denoted as "incompatible networks", in contrast to "compatible networks", which operate according to substantially identical protocols. The result is that the Subscriber cannot have the same arrangement he previously had, where telephone 103 and telephone 105 (FIG. 1) both had telephone number 107 and where he could access one or more common Subscriber services 109 in a substantially identical fashion from either telephone 103 or telephone 105. Instead, as shown in FIG. 2, telephone 205 has a distinct telephone number 207 (052499035) and Subscriber services 209. Secondary telephone 103 has a telephone number 208 (064120123).

Although it may be possible, using prior art techniques, for the Service Provider to automatically perform a "call-forwarding" operation to re-route a call 211 originally directed to 052499035 (telephone number 207) via a call forward 213 to 064120123 (telephone number 208), it is not possible for telephone 103 and telephone 205 to be treated the same at the service level, because they communicate over separate and distinct networks. Neither is it possible for telephone 103 and telephone 205 to share a common telephone number, because the arrangement shown in FIG. 1, which shares telephone number 107 between telephone 103 and telephone 105, is not applicable to separate networks. This limitation further restricts the Subscriber from accessing the same (common) Subscriber services (such as his voice-mail box) from both telephones. From telephone 103 he can access Subscriber services 109 but not Subscriber services 209, whereas from telephone 205 he can access Subscriber services 209 but not Subscriber services 109.

In addition to the non-limiting example given above, there are other reasons to desire the capability of sharing a common telephone number and common Subscriber services between two telephones communicating over distinct networks. As noted previously, the GSM technology is a de facto standard in European and Asian markets, and Service Providers in other regions may wish to migrate their subscriber base to GSM. This can prove difficult in large markets, such as the North American market, where a substantial infrastructure investment is needed to duplicate the coverage of the existing TDMA network in a parallel GSM network. Accordingly, a Service Provider might prefer to introduce the new GSM network gradually into operation. Unfortunately, however, this means that the GSM network may be put into operation without full coverage of the subscriber area. In order to obtain full coverage, therefore, it may therefore be necessary for the Subscriber to continue to utilize an existing TDMA telephone in addition to a new GSM telephone (or, alternatively, a single telephone that can communicate with both a TDMA network and a GSM network). Thus, there are other cases where a Subscriber may have two different telephones communicating over two different networks, where the same telephone number may be desired for both telephones, and access to the same (common) Subscriber services may be desired for both telephones as well.

Not only do the limitations of the prior art in handling the situations described above create a disadvantage to the Subscriber, but from a more general marketing standpoint it is noted that the Subscriber is not expected to be aware of the technical aspects of the different cellular telephone technologies and networks based thereon. To the Subscriber, the differences between one cellular telephone and another involve issues such as size, cost, and other tangible consumer features. The subscriber market is thus not to be expected to be understanding of the technical limitations created by incompatibilities between telephones in different networks. As a consequence, any limitations in technical compatibility between different cellular networks can result in marketing disadvantages to the Service Provider as well as inconvenience to the Subscribers.

As noted previously, the examples presented above are provided solely to illustrate the nature of consequences resulting from the technical incompatibilities of different networks that are in simultaneous use, and are not intended to imply that the limitations of current systems affect only such cases. In particular, the above examples of prior art limitations can be extended to any combination of several telephones installed in automobiles and carried on one's person (such as two different telephones installed in two different automobiles, two different telephones carried on one's person, and so forth), and can also be extended to a single telephone capable of communicating over several different networks. Furthermore, although the illustrations and examples presented herein are expressed in terms of TDMA/CDMA (using IS-41 protocol) and GSM networks, it is understood that the technical limitations of existing cellular communications systems are not restricted to such networks, but are encountered in cellular networks of all types. Moreover, the limitations of the prior art affect not only cellular telephones, but mobile stations in general, including, but not limited to cellular telephones and wireless data terminals.

Roaming and the "Interworking Interoperability Function" (IIF), and GAIT

When a Subscriber mobile station is physically located outside the region supported by the Subscriber's Service Provider, a "roaming" condition exists, whereby the mobile station must be registered with the HLR (Home Location Register) of a network other than the original network with which the mobile station is associated. Normally, a mobile station is capable of roaming only within a compatible network. That is, a TDMA telephone can roam only within a TDMA network; a GSM telephone can roam only within a GSM network; and so on. However, due to the increased geographical mobility of the subscriber base, there are many mobile subscribers who would like to use their mobile telephones without such a restriction. To achieve such an advantage, the GAIT (GSM/ANSI-41 Interoperability Team) protocol has been developed to implement an Interworking Interoperability Function (IIF), whereby a multi-protocol mobile telephone (such as the GAIT-compliant Nokia 6340 telephone) can roam in both TDMA and GSM networks, provided that these networks are enhanced to support the GAIT protocol, by the addition of special equipment. Effectively, GAIT allows constructing a multi-protocol network from a single-protocol TDMA network and a single-protocol GSM network, such that the TDMA network and the GSM network can share information about mobile subscribers, wherein the subscribers obtain access to most services when using either type of protocol with a GAIT-compliant multi-protocol telephone. The GAIT protocol is covered in a number of detailed documents which are part of the published GSM/ANSI-136 Interoperability Team Specification.

Although GAIT provides a solution whereby a mobile subscriber can roam in both TDMA and GSM networks, there are several practical and marketing disadvantages to this approach: To begin with, the Service Provider must make a substantial investment in the network infrastructure. In addition, the Subscriber must purchase a special GAIT-compliant multi-protocol telephone (capable of operating over both TDMA networks and GSM networks). Such multi-protocol telephones are typically much more expensive than regular single-protocol telephones (which function either over a TDMA network or over a GSM network, but not over both). In addition, there is much less variety available among GAIT-compliant multi-protocol telephones than there is among single-protocol telephones. For example, a Subscriber has many different models of inexpensive single-protocol GSM telephones from which to choose, some of which offer special features and benefits which may be of value to the Subscriber. In contrast, there are relatively few GAIT-compliant multi-protocol telephones available. With GAIT, therefore, the Subscriber has to pay much more for a telephone, but has much less choice. Moreover, the future of multi-protocol networks is not clear: it is likely that the importance of "interoperability" between different network technologies will decline in the future as wireless communication standards evolve and merge into a single unified global network. Thus, the substantial added investment in GAIT technology (for both the Subscriber and the Service Provider alike) is liable to realize a return only over a relatively short term. Consequently, many Service Providers are reluctant to make the large investment in GAIT-compliant technology. Furthermore, even though GAIT provides for so-called "seamless" roaming, the precise nature of the Subscriber Services may still vary from one network to another, and the Subscriber may experience some discontinuities in such Subscriber Services when using GAIT-compliant multi-protocol networks and telephones. As a result from a marketing and economic standpoint, GAIT may not be a completely satisfactory long-term solution to the challenges encountered in frequent and prolonged Subscriber roaming.

There are a number of other prior-art technologies which also relate to various aspects of the issues of inter-network compatibility and unity of services. Some of these are addressed below:

For example, United States Patent application 20020012351 by Sofer, et al. (hereinafter referred to as "Sofer"), discloses a method and system for providing services to roaming subscribers of mobile telephone networks which are applicable to different network protocols. However, Sofer does not disclose means by which different wireless technologies may be integrated, nor does it cover the use of different telephones which share, or are intended to share, a common telephone number.

As another example, Ericsson, in addition to providing a GAIT-compliant "Mobility Gateway", also offers a "Fixed Mobile Convergence" (FMC) solution in which a single telephone number may be used for both a fixed (land-line based) telephone and a mobile telephone, and in which certain Subscriber Services, such as voice mail and billing, may be integrated. The Ericsson FMC solution, however, differs from the background of the present invention in that one of the essential telephone systems involved is not a mobile network.

Despite the broad interest in inter-network compatibility and unity of services, there is no present technology capable of combining both inter-network compatibility and unity of services along with telephone number transparency in a cost-effective manner and easy manner based on existing single-protocol equipment.

There is thus a need for, and it would be highly advantageous to have, a method and system for cost-effectively providing multi-protocol network access to provide telephone number transparency and complete unity of common Subscriber services to the Subscriber. It would furthermore be advantageous to provide such a capability which the Subscriber may utilize without having to obtain a multi-protocol telephone, and which likewise does not require the Service Provider to invest in extensive modifications to the networks. These goals are met by the present invention.

SUMMARY OF THE INVENTION

The present invention enables a Service Provider to configure a wireless multi-protocol network from an innovative combination of wireless single-protocol networks in combination with certain adaptations and extensions of the call termination and registration processing procedures, by which the Subscriber does not need to use a multi-protocol wireless telephone, but instead may utilize readily-available single-protocol wireless telephones. In order to gain multiple-network access, the Subscriber utilizes a separate single-protocol wireless telephone for each of the supported protocols, each of which is associated with the same CLI.

The invention provides for a wireless multi-protocol communications system for use by a subscriber, by a method whose steps include:

(a) providing a first single-protocol mobile station to the subscriber;
(b) providing a first wireless single-protocol network compatible with the first single-protocol mobile station;
(c) providing a second single-protocol mobile station to the subscriber, wherein the second single-protocol mobile station is incompatible with the first wireless single-protocol network;
(d) providing a second wireless single-protocol network compatible with the second single-protocol mobile station;
(e) providing a common telephone number;
(f) providing a common CLI; and
(g) configuring the first single-protocol mobile station, the first wireless single-protocol network, the second single-protocol mobile station, and the second wireless single-protocol network such that the first single-protocol mobile station and the second single-protocol mobile station share the common telephone number and the common CLI, and such that the subscriber cam use both the first single-protocol mobile station and the second single-protocol mobile station in a substantially identical fashion.

In the above method, the steps are listed in a particular non-limiting sequence for convenience only, and it is to be understood that the same effect can be obtained by performing the steps in different orders as well.

Likewise, the present invention provides for two incompatible single-protocol mobile stations to share a common CLI. It is to be noted that this is distinct from the GAIT protocol, where the Subscriber utilizes one multi-protocol telephone.

For example, in a TDMA/GSM multi-protocol network configured according to the present invention, a Subscriber would use both a single-protocol TDMA telephone and a single-protocol GSM telephone. As previously noted, such telephones are relatively inexpensive and are available in a great variety of styles with many different features to suit the preferences and needs of the Subscriber. Normally, a Subscriber would already have at least one such telephone, and would therefore have to obtain only one additional telephone. Although the Subscriber would need two single-protocol telephones instead of one multi-protocol telephone (as in a GAIT-compliant multi-protocol network), there are several advantages for both the Subscriber and the Service Provider with such a multiple-telephone arrangement. First, in a multi-protocol network according to the present invention, both telephones are completely independent and may be used simultaneously, such as by other members of the Subscriber's family. According to the present invention, these two telephones are not only independent of one another, but may also initiate calls to each other. In addition to the increased Subscriber convenience offered by such an arrangement, both telephones can simultaneously generate revenue for the Service Provide.

It is an objective of the present invention to provide a method and system for allowing two cellular telephones communicating over distinct networks to share a common telephone number, such that one telephone may be designated as the primary telephone and that the other telephone may be designated as the secondary telephone, and such that substantially identical common Subscriber services are accessible from both telephones in the same manner.

Another objective of the present invention is to allow both the primary and secondary telephone to be able to access the same (common) Subscriber services in a substantially identical manner, and that Subscriber services which would otherwise be available on only one of the networks would be available to the subscriber on both telephones without the need for the Subscriber to manage the Subscriber services separately for each telephone.

It is a further objective of the present invention to provide a means by which two telephones communicating over different networks and having a common telephone number may intercommunicate with one another via the networks.

It is a still further objective of the present invention to provide a means by which two telephones communicating over different networks and having a common telephone number may simultaneously engage in independent communications, and that in the event that coverage is not available for one of the networks, the telephone of the other network is capable of communicating in a normal fashion.

It is an overall objective of the present invention that the foregoing objectives be attainable principally through the use of existing single-protocol networks and existing single-protocol telephones, and that no special multi-protocol devices or standards are required.

Definitions

The foregoing and following descriptions of the present invention and the background thereof make reference to the terms below, which herein denote Cell site a portion of a specified network including a transceiver and an antenna at an allocated frequency band, and which is not shared with any other network.

Compatible referring to a mobile station and a network which operate according to substantially the same protocol; also referring to two mobile stations which operate according to substantially the same protocol; and also referring to two networks which operate according to substantially the same protocol. For example a GSM telephone and a GSM network are compatible, and so forth.

Incompatible referring to a mobile station and a network which do not operate according to substantially the same protocol; and also referring to two mobile stations which do not operate according to substantially the same protocol; and also referring to two networks which do not operate according to substantially the same protocol. For example, a GSM telephone is incompatible with a TDMA network; a GSM telephone and a TDMA telephone are incompatible; a GSM network and a TDMA network are incompatible; and so forth.

Mobile Station any mobile (wireless) device that can communicate with a network, including, but not limited to wireless telephones and wireless data terminals. A mobile station can be said to communicate "over" or "in" a network if that mobile station is capable of communicating and functioning with that network. The term "telephone" is also used herein for convenience and for purposes of illustration, and is used in a non-limiting fashion to designate any such mobile station, including wireless data terminals, whether or not employed for traditional telephony.

Multi-protocol network a network which can operate according to more than one protocol. A non-limiting example of a single-protocol network is a GAIT-compliant network, which can operate according to TDMA protocols and can also operate according to GSM protocols.

Multi-network telephone a mobile station which can operate over a multi-protocol network. A non-limiting example of a multi-protocol telephone is a GAIT-compliant telephone, which operates both in a TDMA mode and a GSM mode when operating over a multi-protocol network.

Network a communication system for which there is at least one mobile station that can communicate thereover, at least one cell site (unique to the network and not shared with any other network), and at least one switch (unique to the network and not shared with any other network). Unless otherwise specified, any reference herein to a "network" is intended to mean a mobile (wireless) communication network.

Page an attempt by a network to place a call to a mobile station.

Primary telephone the principal telephone of a multiplicity of telephones for which a network, upon receiving an incoming call, initiates a page either simultaneous with or prior to initiating a page for any other telephone. Similarly, a primary mobile station. It is the profile of the primary telephone which defines the searching/paging parameters as either simultaneous or sequential (primary telephone first).

Secondary telephone the telephone of a multiplicity of telephones for which a network, upon receiving an incoming call, initiates a page either simultaneous with or subsequent to a failure of the page (not reachable, busy, or no answer) of the primary telephone of that multiplicity. Similarly, a secondary mobile station. The profile of the primary telephone defines the searching/paging parameters as either simultaneous or sequential (primary telephone first).

Service Provider a commercial entity which offers cellular telephony services and related Subscriber services to the public.

Single-protocol telephone a mobile station which can operate over only a single type of single-protocol network. A non-limiting example of a single-protocol telephone is a normal TDMA telephone, which operates over only a TDMA network and cannot operate over a GSM network.

Single-protocol network a network which operates according to only one protocol. A non-limiting example of a single-protocol network is a normal TDMA network, which operates only according to TDMA protocols and cannot operate according to GSM protocols.

Subscriber an individual who obtains cellular telephony services and related Subscriber services from a Service provider.

Subscriber services services provided to the Subscriber by the Service Provider which include, but are not limited to: voice mail, voice mail notifications, e-mail, Internet access, caller ID, unified billing, voice-activated dialing, and VPN (virtual private network).

As noted previously, the illustrations and examples herein are expressed in terms of TDMA networks and GSM networks. The present invention, however, is not limited to these particular networks, but can be applied to different cellular networks in general. It is further noted that although the present invention is illustrated herein as providing for the sharing of a common telephone number and common Subscriber services between two distinct networks, the present invention is not limited to two distinct networks, but may also be extended to greater numbers of distinct networks. It is moreover noted that although the present invention is illustrated herein in terms of cellular telephones, the present invention is not limited to such devices, but also applies to other mobile devices as well, such as mobile data terminals.

It will be understood that a system according to the present invention may be a suitably-programmed computer, and that a method of the present invention may be performed by a suitably-programmed computer. Thus, the invention contemplates a computer program that is readable by a computer for emulating or effecting a system of the invention, or any part thereof, or for executing a method of the invention, or any part thereof. The term "computer program" herein denotes any collection of machine-readable codes, and/or instructions, and/or data residing in a machine-readable memory or in machine-readable storage and executable by a machine for emulating or effecting a system of the invention or any part thereof, or for performing a method of the invention or any part thereof.

The present invention provides for the following;

A method for providing a wireless multi-protocol communications system for use by a subscriber, the method including the steps of: (a) providing a first single-protocol mobile station to the subscriber; (b) providing a first wireless single-protocol network compatible with the first single-protocol mobile station; (c) providing a second single-protocol mobile station to the subscriber, wherein the second single-protocol mobile station is incompatible with the first wireless single-protocol network; (d) providing a second wireless single-protocol network compatible with the second single-protocol mobile station; (e) providing a common telephone number; (f) providing a common CLI; and (g) configuring the first single-protocol mobile station, the first wireless single-protocol network, the second single-protocol mobile station, and the second wireless single-protocol network such that the first single-protocol mobile station and the second single-protocol mobile station share the common telephone number and the common CLI, and such tat the subscriber can use both the first single-protocol mobile station and the second single-protocol mobile station regarding the common telephone number in a substantially identical fashion.

A method for providing a wireless multi-protocol communications system for use by a subscriber, the method including the steps of: (a) providing a first single-protocol mobile station to the subscriber; (b) providing a first wireless single-protocol network compatible with the first single-protocol mobile station; (c) providing a second single-protocol mobile station to the subscriber, wherein the second single-protocol mobile station is incompatible with the first wireless single-protocol network; (d) providing a second wireless single-protocol network compatible with the second single-protocol mobile station; (e) providing at least one common subscriber service; and (f) configuring the first single-protocol mobile station, the first wireless single-protocol network, the second single-protocol mobile station, the second wireless single-protocol network, and the at least one common subscriber service such that the first single-protocol mobile station and the second single-protocol mobile station share the common subscriber service, and such that the subscriber can use both the first single-protocol mobile station and the second single-protocol mobile station to access the common subscriber service in a substantially identical fashion.

A first single-protocol mobile station having a configuration including a CLI, wherein the CLI is simultaneously associated with a second single-protocol mobile station, and wherein the second single-protocol mobile station is incompatible with the first single-protocol mobile station.

A wireless multi-protocol communications system for use by a subscriber, the system including: (a) a plurality of incompatible wireless single-protocol networks; (b) a plurality of single-protocol mobile stations, such that for each of the wireless single-protocol networks there is at least one of the single-protocol mobile stations operative to communicating thereover; and (c) a common telephone number which is shared among at least two of the mobile stations which are operative to communicating over incompatible wireless single-protocol networks; wherein the subscriber can utilize any of the at least two mobile stations to conduct communications according to the common telephone number in a substantially identical fashion.

A wireless multi-protocol communications system for use by a subscriber, the system including: (a) a plurality of incompatible wireless single-protocol networks; (b) a plurality of single-protocol mobile stations, such that for each of the wireless single-protocol networks there is at least one of the single-protocol mobile stations operative to communicating thereover; and (c) at least one common subscriber service which is shared among at least two of the mobile stations which are operative to communicating over incompatible wireless single-protocol networks; wherein the subscriber can utilize any of the at least two mobile stations to access the at least one common subscriber service in a substantially identical fashion.

A method for terminating an incoming call to a common telephone number shared between a primary single-protocol mobile station and a secondary single-protocol mobile station; wherein the primary mobile station communicates over a first single-protocol network having a first gateway and a first switching center connected to a mobile number portability platform; wherein the secondary mobile station communicates over a second single-protocol network having a second gateway and a second switching center; wherein the primary mobile station has a first inherent telephone number and the secondary mobile station has a second inherent telephone number; and wherein a first call forwarding to the second inherent telephone number is associated with the primary mobile station; the method including the steps of: (a) upon receiving the incoming call to the common telephone number, directing the incoming call to the second gateway; (b) constructing a derivative telephone number which is an unambiguous function of the common telephone number; (c) issuing a call delivery to the first gateway using the derivative telephone number; (d) obtaining the recovered inherent telephone number of the primary mobile station from the derivative telephone number; (e) issuing a call delivery to the first switching center using the recovered inherent telephone number of the primary mobile station; (f) issuing a first page to the primary mobile station, (g) upon failure of the first page, performing the first call forward to the second inherent telephone number via the mobile number portability platform; (h) upon response from the mobile number portability platform that the second inherent telephone number does not exist within the first network, issuing a call delivery to the second gateway; and (i) issuing a second page to the secondary mobile A method for accessing common subscriber services associated with a common telephone number from a single-protocol mobile station communicating over a single-protocol network having a mobile switching center with a visitor location register; wherein the mobile station has an inherent telephone number distinct from the common telephone number; and wherein the network is operative to accessing a server providing such common subscriber services; the method including the steps of: (a) requesting access of common subscriber services and identifying the mobile station to the visitor location register according to the inherent telephone number: (b) relating the inherent telephone number to the common telephone number; (c) sending the common telephone number to the switching center; and (d) issuing a call delivery for the requested common subscriber services to the server.

A method for registering a single-protocol mobile station having an inherent telephone number with a single-protocol network; wherein the network has a switching center with a visitor location register; wherein the network has a home location register; and wherein the registering associates a common telephone number with the mobile station distinct from the inherent telephone number; the method including the steps of: (a) issuing a registration of the mobile station with the visitor location register, using the inherent telephone number; (b) sending a Registration Notification to the home location register, using the inherent telephone number; and (c) returning a Registration Notification response to the visitor location register using the common telephone number.

A first single-protocol mobile station operating over a fist wireless single-protocol network and having a configuration including a Calling Line Identity, wherein the Calling Line Identity is associated with a second single-protocol mobile station, and wherein the second single-protocol mobile station operates over a second wireless single-protocol network incompatible with the first wireless single-protocol network.

A single-protocol GSM mobile station operating over a single-protocol GSM network and having a configuration including a Calling Line Identity, wherein the Calling Line Identity is associated with a single-protocol TDMA mobile station operating over a single-protocol CDMA network.

A first single-protocol mobile station operating over a fist wireless single-protocol network and having a configuration including a telephone number, wherein the telephone number is associated with a second single-protocol mobile station, and wherein the second single-protocol mobile station operates over a second wireless single-protocol network incompatible with the first wireless single-protocol network.

A single-protocol GSM mobile station operating over a single-protocol GSM network and having a configuration including a telephone number, wherein the telephone number is associated with a single-protocol TDMA mobile station operating over a single-protocol COMA network.

A fist single-protocol mobile station operating over a first wireless single-protocol network and having a configuration for accessing a common subscriber service, wherein the common subscriber service is accessible by a second single-protocol mobile station operating over a second wireless single-protocol network incompatible with the first wireless single-protocol network.

A single-protocol GSM mobile station operating over a single-protocol GSM network and having a configuration for accessing a common subscriber service, wherein the common subscriber service is accessible by a single-protocol TDMA mobile station operating over a single-protocol TDMA network.

BRIEF DESCRIPTION Or THE DRAWINGS

The invention is herein described, by way of example only, with reference to the accompanying drawings, wherein:

FIG. 1 conceptually illustrates a prior art scheme for assigning a primary and secondary telephone sharing a common telephone number and common Subscriber services in a single network.

FIG. 2 conceptually illustrates a prior art configuration of two different networks supporting call forwarding between two telephones which share neither a common telephone number nor common Subscriber services.

FIG. 3 conceptually illustrates a configuration according to the present invention allowing two telephones in different networks to share a common telephone number and common Subscriber services.

DESCRIPTION OF THE PREFERRED EMBODIMENTS

Figure 1:
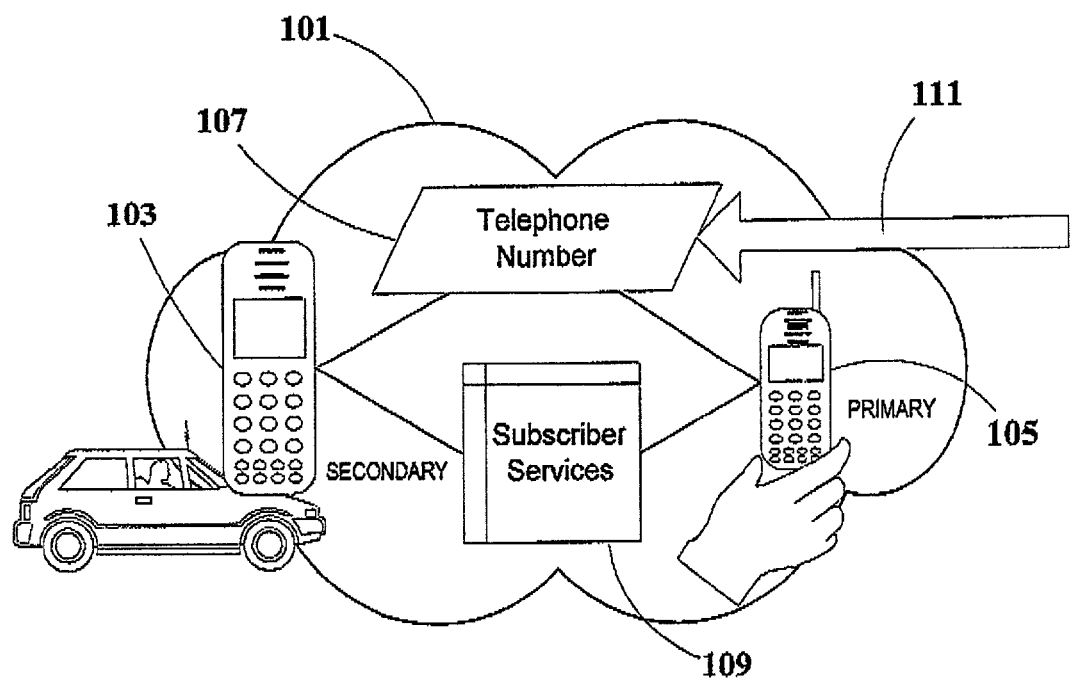

The principles and operation of a system and method according to the present invention may be understood with reference to the drawings and the accompanying description. The following descriptions and the accompanying drawings are of exemplary embodiments of the present invention, and solely for the purpose of illustrating the operation thereof, and do not limit the scope or applicability of the invention.

As previously noted, the present invention pertains to mobile stations in general (such as wireless data terminals), and is not limited to telephony. It is common in the art to refer to a wireless telephone as a "mobile station," abbreviated as "MS". Accordingly, and for consistency, the examples and drawings herein make reference to such an element of the present invention equivalently as a "telephone" or as an "MS" (Mobile Station). It is to be understood that such an element identified by a particular reference number in a drawing or description may be variously referred to by the term "telephone", "MS" (Mobile Station), or both. Furthermore, in keeping with the non-limiting examples of GSM and TDMA networks which are used for the purposes of illustrating the present invention, these elements may variously be associated with GSM or TDMA networks in the drawings and descriptions.

Figure 2:
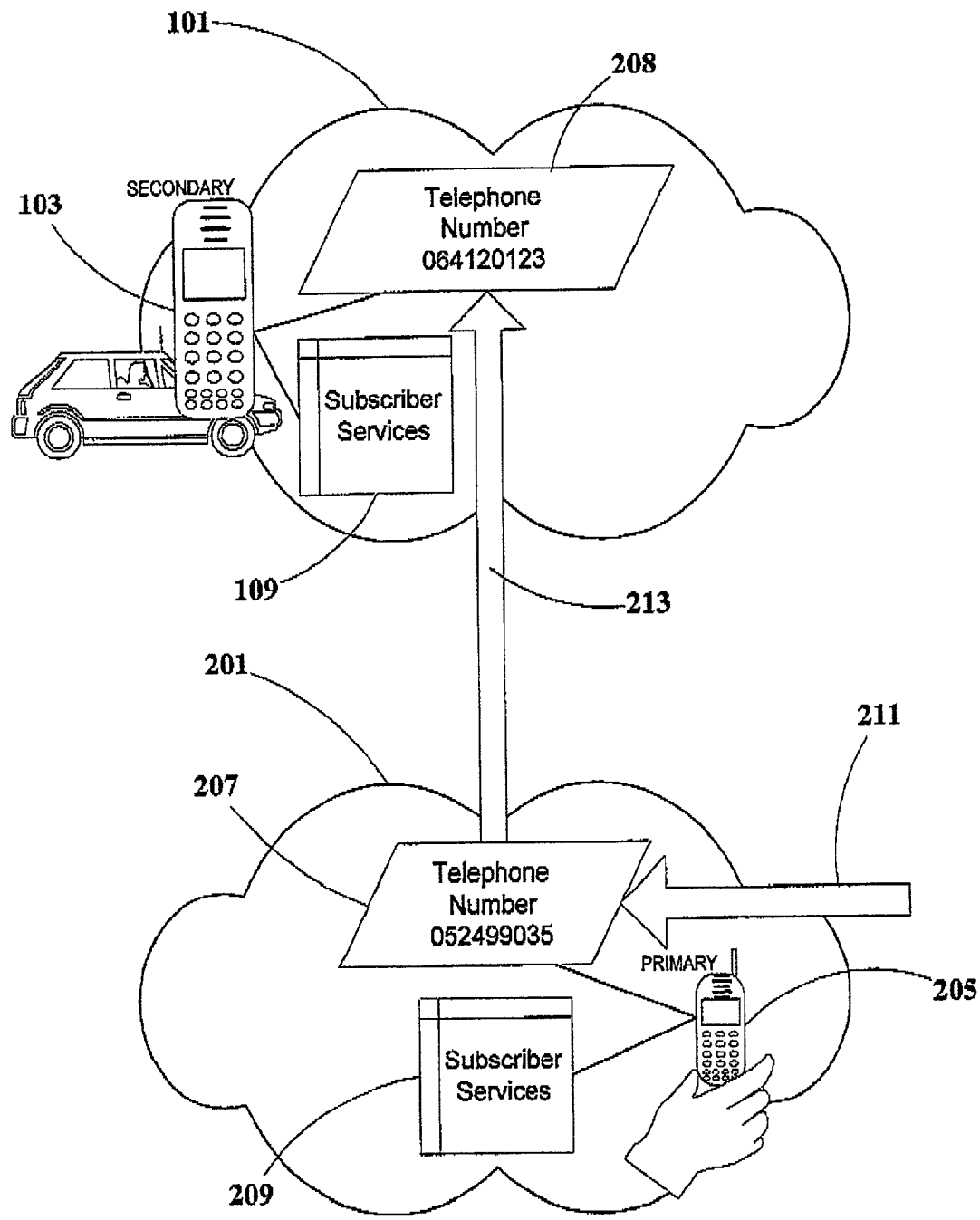
Figure 3:
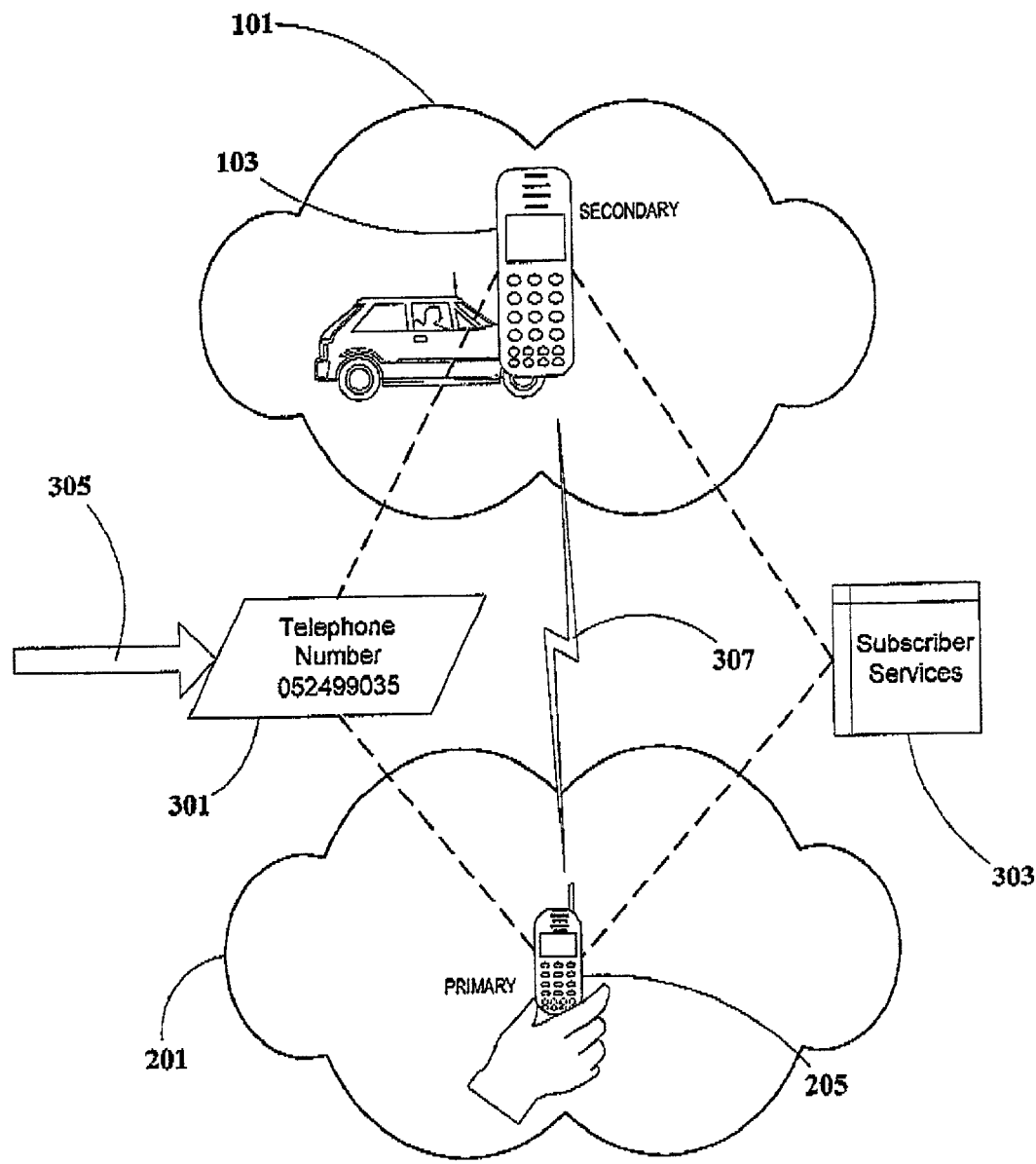

FIG. 3 conceptually illustrates a configuration according to the present invention, having telephone 103 communicating over network 101, and telephone 205 communicating over network 201. The telephones and networks shown in FIG. 3 are the same as those shown in FIG. 2, to illustrate the similarities of the present invention with respect to the prior art, but unlike the prior art of FIG. 2, the present invention provides a common telephone number 301 (052499035) which is used to access both telephone 103 and telephone 205, so that an incoming call 305 will be routed first to primary telephone 205, and thence to secondary telephone 103 if telephone 205 is not reachable, is busy, or does not answer. Also, unified common Subscriber services 303 are accessible in substantially identical fashion to both telephone 103 and telephone 205. Furthermore, telephone 103 and telephone 205 can simultaneously conduct independent communications, and, in particular, a communication link 307 can be established between telephone 103 and telephone 205.

As will be detailed below, at the device level, telephone 103 and telephone 205 do not have the same telephone number. The system according to the present invention, however, makes it look to the users as if telephone 103 and telephone 205 do in all practical ways have the same telephone number.

Descriptions and drawings that follow make reference to applicable industry standards, nomenclature, and terminology. For TDMA this includes IS-41 (Interim Standard 41), and for GSM this includes MAP (Mobile Application Protocol). The IS-41 standard is also referred to as TIA/EIA-41 (Telecommunications Industry Association/Electronics Industry Alliance). These standards are well-known in the art.

Figure 4:
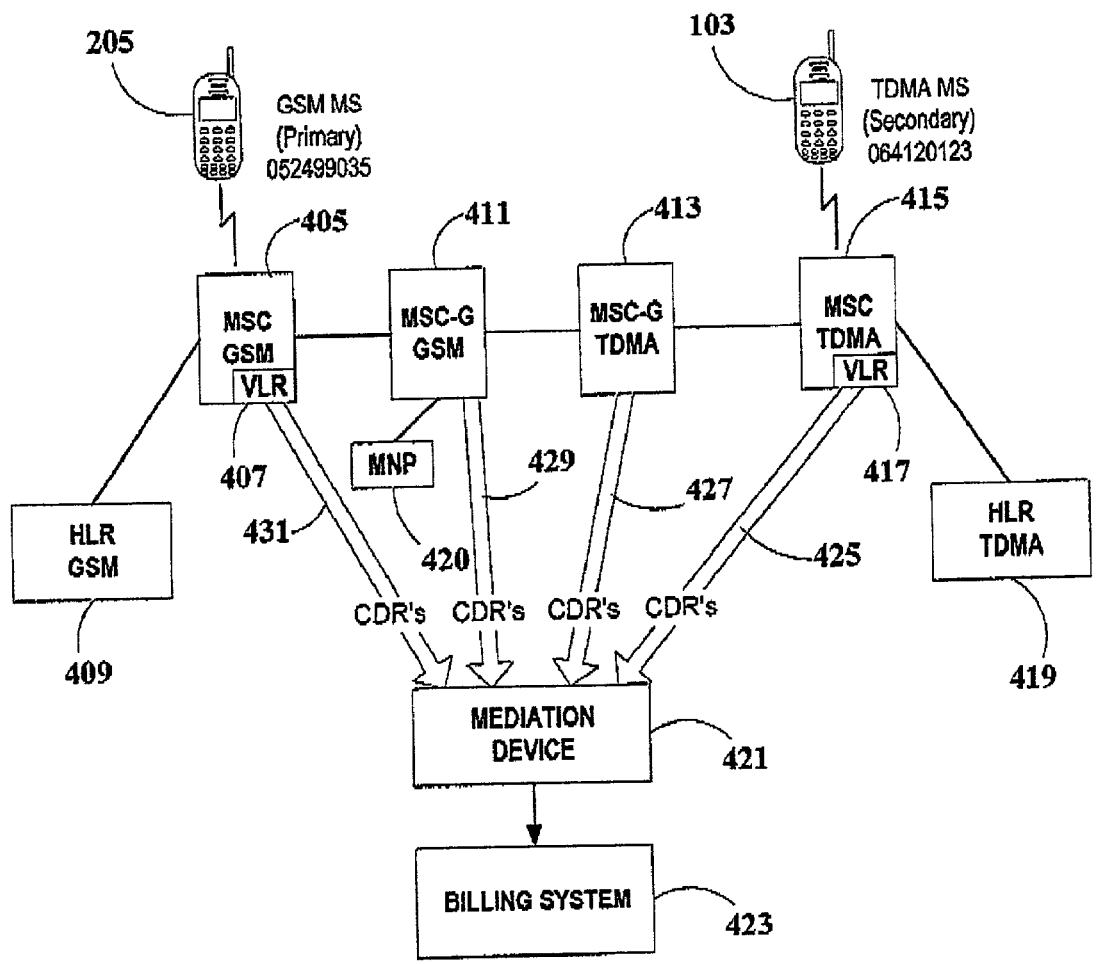
FIG. 4 is a block diagram of a configuration according to the present invention showing the principal communication elements involved and showing how two networks combine their calling records together for unified Subscriber billing.

FIG. 4 is a block diagram of a network configuration according to the present invention, showing the principal communication elements involved and how unified billing is accomplished. A primary GSM MS (such as a GSM telephone) 205 communicates with a GSM MSC (Mobile Switching Center) 405 which contains a VLR (Visitor Location Register) 407. Likewise, a secondary TDMA MS 103 (such as a TDMA telephone) communicates with a TDMA MSC 415 which contains a VLR 417. Also involved in communications are a GSM MSC-G (Gateway MSC) 411, an MNP (Mobile Number Portability) platform 420 accessible to GSM MSC-G 411, a TDMA MSC-G 413, a GSM HLR (Home Location Register) 409, and a TDMA HLR 419. A CDR (Call Detail Record) 431 is sent from GSM MSC 405 to a mediation device 421, which puts the data of the CDR into a uniform format for processing by a billing system 423. In a similar manner, GSM MSC-G 411, TDMA MSC-G 427, and TDMA MSC 415 send a CDR 429, CDR 427, and CDR 425, respectively, to mediation device 421 for formatting and sending to billing system 423 to prepare a unified billing statement to the Subscriber, which combines the Subscriber's billable activity on both telephone 205 and telephone 103.

It is to be noted that in FIG. 4, primary telephone 205 is shown as a GSM MS with a telephone number 052499035, which is the same as the common telephone number 305 (FIG. 3) that is to be associated with both primary telephone 205 and secondary telephone 103. In FIG. 4, however, secondary telephone 103 is shown as a TDMA MS with a telephone number 064120123. The telephone numbers in FIG. 4 are those which would normally be associated with the respective telephones. To avoid confusion between the numbers that are normally associated with the telephones and the common number that is to be shared by telephones in a system according to the present invention, the term "inherent telephone number" herein denotes to telephone number assigned at the device level to a mobile station, which is normally associated with that telephone in a prior art network. In contrast, the term "common telephone number" herein denotes the shared number which is associated with more than one telephone at the system level in a system according to the present invention Thus, the telephone numbers in FIG. 4 are inherent telephone numbers, whereas telephone number 305 in FIG. 3 is a common telephone number. It is possible that a common telephone number can be the same as an inherent telephone number, as is the case illustrated in FIG. 4, where the inherent telephone number of primary telephone GSM MS 205 is the same as common telephone number 305 in FIG. 3.

Figure 5:
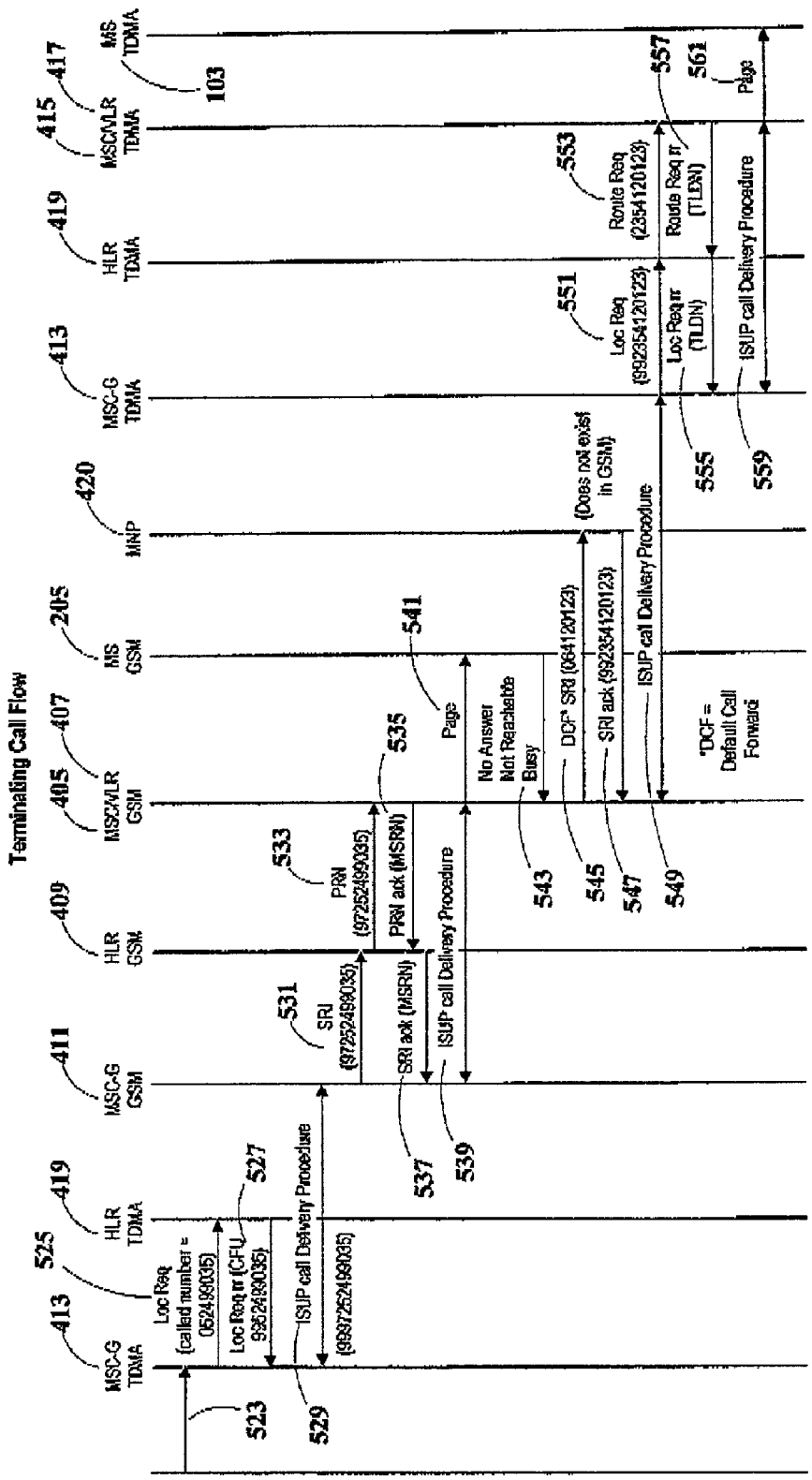
FIG. 5 shows the incoming call flow for termination of the call, that takes place when a call is received and handled by the dual network configuration of the present invention.

FIG. 5 (with reference also to FIG. 4 regarding the indicated network components) illustrates the terminating call flow according to the present invention, showing how an incoming call 523 to the common number 052499035 (telephone number 305 of FIG. 3) is routed first to primary MS 205, and then to secondary MS 103 when primary MS 205 does not respond (no answer, not reachable, or busy). TDMA MSC-G 413 issues a Location Request message 525 for the called number to TDMA HLR 419, which sends back a return result of CFU (Call Forward Unconditional) 527 to the number 9952499035The digits '99' are a prefix according to the present invention, which has been pre-configured during system provisioning to be affixed to the CPU, and signify that the call is to be forwarded to the GSM network (network 201 of FIG. 3), in which primary MS 205 communicates, as detailed in the following actions. It is noted that during this process the '99' prefix is added when needed and removed when not needed. In general terms, the method of the present invention involves construction of a derivative telephone number which is an unambiguous function of common telephone number 301 (FIG. 3) that can be unequivocally recognized by the system as being designated for routing to the primary telephone, and from which can be recovered the inherent telephone number of the primary telephone. In this example, such an unambiguous function is effected by using the inherent telephone number of primary telephone GSM MS 205 as common telephone number 301 and then affixing a prefix thereto; and the inversion of the function is effected by removing the prefix (where all such operations ignore the leading 0 in the telephone number of this example). The construction of a suitable derivative telephone number can be accomplished through other functions, however, and is not necessarily limited to the affixing of a prefix, nor does it necessarily involve using the inherent telephone number of the primary telephone as the common telephone number (although doing so clearly simplifies the process). A suitable unambiguous function could also be affected by utilizing a lookup table to map the common telephone number into a unique derivative number, and then recovering the inherent telephone number of the primary telephone by using another lookup table. Although such functions are feasible, however, they introduce considerable complexity.

Continuing with the call flow, TDMA MSC-G 413 then issues an ISUP (Integrated Services User Part) call delivery procedure 529 for the number 9997252499035, which includes the country code (972 in this example) following the '99' prefix to GSM MSC-G 411, which follows with an SRI (Send Routing Information) 531 to GSM HLR 409. GSM HLR 409 in turn sends a PRN (Provide Routing Number) 533 to VLR 407 incorporated into GSM MSC 405 (FIG. 4). VLR 407 then sends back a PRN acknowledge 535, which GSM HLR 409 receives and uses to issue an SRI acknowledge 537 with an MSRN (Mobile Station Roaming Number) to GSM MSC-G 411. Then, GSM MSC-G 411 issues an ISUP call delivery procedure 539 to GSM MSC 405. Following this, GSM MSC 405 issues a page 541 to primary MS 205.

As noted previously, the secondary telephone page may be simultaneous with the primary telephone page, in which case the secondary telephone page is also initiated at this point. In the case of sequential paging, however, if primary MS 205 is answered, the terminating call flow is complete. However, if primary MS 205 is not reachable, is busy, or is not answered, a response 543 is made to GSM MSC 405, which then issues a Default Call Forward (a generic term used herein corresponding to various proprietary terms, such as Nokia's Operator-Controlled Call Forward, OCCF, and herein denoted by the abbreviation "DCF") SRI 545 to telephone number 064120123 to MNP platform 420. This DCF SRI has been pre-determined during system configuration to be the response when primary MS 205 fails to answer. DCF SRI 545 arrives at MNP platform 420, which determines that telephone number 064120123 does not exist within the GSM network (network 201 of FIG. 3). UP platform 420 then returns SRI acknowledgment 547 to GSM MSC 405, using the number 992354120123, which is the Mobile Identification Number (MN) of the number 064120123 wit the prefix '99'. Next GSM MSC 405 initiates an ISUP call delivery procedure 549 to TDMA MSC-G 413, which then processes this as an incoming call by issuing a Location Request message 551 to TDMA HLR 419, using the number 992354120123. CDMA HLR 419 then removes the '99' prefix and sends a Route Request message 553 (using the MN 2354120123) to TDMA MSC VLR 417, which answers with a Route Request return result TLDN (Temporary Local Directory Number) 557. After this, TDMA HLR 419 answers a Location Request return result 555 to TDMA MSC-G 413, which issues an ISUP call delivery procedure 559 to TDMA MSC 415. Finally, TDMA MSC 415 issues a page 561 to secondary telephone TDMA MS 103 to complete the termination.

It is noted that the terminating call flow of the present invention, as illustrated in FIG. 5, is asymmetrical, in that incoming calls are always directed to TDMA MSC-G 413, ad in that only GSM MSC-G 411 is associated with MNP capabilities (through MNP platform 420). This asymmetry determines which of the telephones is effectively the "primary" telephone, and which is effectively the "secondary" telephone. As shown in FIG. 5, the telephone which communicates in the network whose gateway MSC receives the incoming calls is the "secondary" telephone, because the initial page (page 541) is directed to the telephone communicating over the other network.

Figure 6:
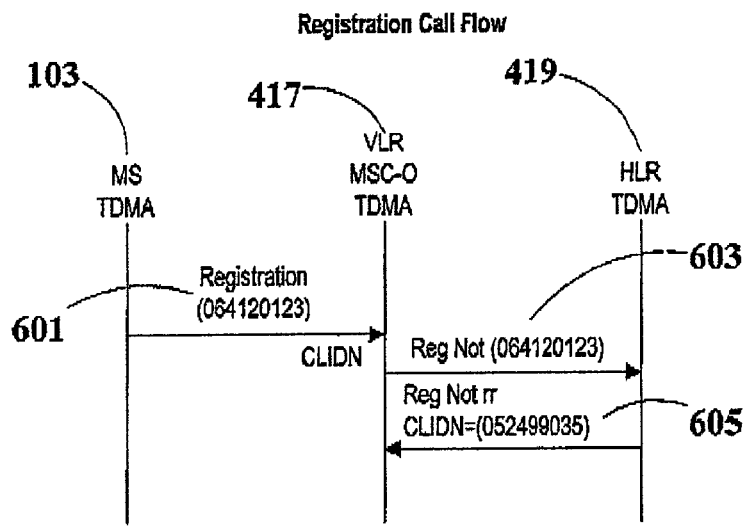
FIG. 6 shows subscriber profile registration call flow and the CLIDN feature downloaded to the Subscriber.

FIG. 6 illustrates the call flow for registration of secondary telephone TDMA MS 103 with network 101 (FIG. 3), in order that secondary telephone TDMA MS 103 can be associated with the same CLI as primary telephone GSM MS 205 FIG. 4). TDMA MS 103 initiates a registration 601 to TDMA MSC-O (Originating MSC) VLR 417 referencing the secondary telephone number 064120123, which is associated with TDMA MS 103. Then, TDMA MSC-O VLR 417 sends a Registration Notification 603 to TDMA HLR 419, also referencing the secondary telephone number 064120123. Finally, TDMA HLR 419 responds with a Registration Notification return result 605, referencing the primary telephone number 052499035 as the CLIDN (Calling Line Identity Directory Number), which is associated with GSM MS 205 (FIG. 4). The CLI of the secondary telephone is defined as the DN of the primary telephone. Secondary telephone TDMA MS 103 is thus registered in such a manner as to be associated with common telephone number 301 (FIG. 3). It is noted that a variant of this call flow could also be used to register a primary telephone, but doing so would require corresponding changes to the configuration of the networks as well as the terminating call flow illustrated in FIG. 5.

Figure 7:
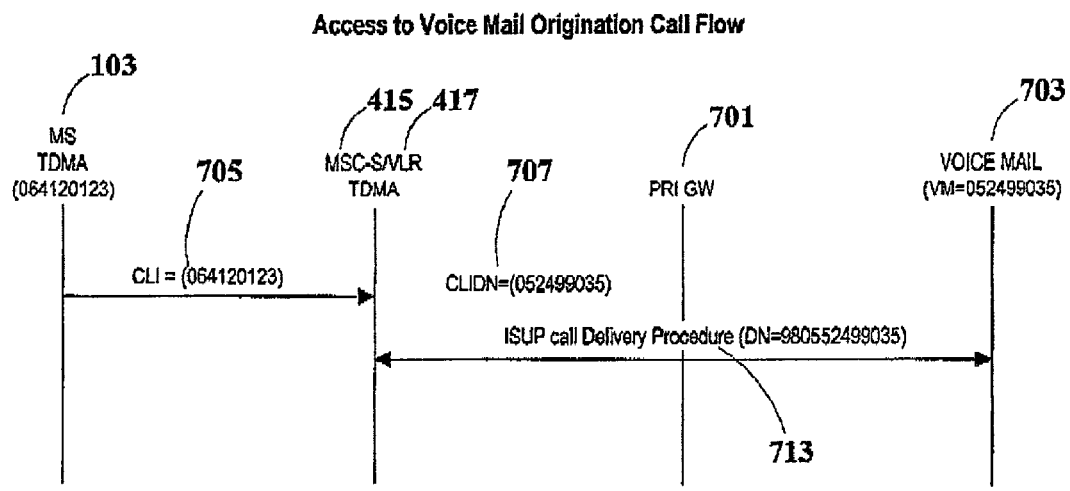
FIG. 7 shows access-to-voice-mail call flow, wherein the Subscriber is identified via his common telephone number, whereas his telephone is identified with the inherent telephone number.

FIG. 7 illustrates the call flow by which secondary telephone TDMA MS 103, having the telephone number 064120123, accesses the voice mail box of primary telephone GSM MS 205 (FIG. 2), which has the telephone number 052499035. This procedure is exemplary of the way in which secondary telephone TDMA MS 103 accesses Subscriber services 209 FIG. 2), which are associated with primary telephone 205. Along with a request for the desired Subscriber services, secondary telephone TDMA MS 103 identifies itself to TDMA MSC-S (Serving MSC) VLR 417 as being associated with telephone number 064120123 (secondary telephone number 208 in FIG. 2) in a CLI 705. Following this, TDMA MSC-S VLR 417 relates secondary telephone TDMA MS 103 to a CLIDN 707 associated with telephone number 052499035 (primary telephone number 207 in FIG. 2). TDMA MSC-S 415 then initiates an ISUP call delivery procedure 713 across a PRI GW (ISDN protocol Primary Rate Interface Gateway) 701 to a voice mail server 703 for VM (Voice Mail) associated with primary telephone number 052499035. ISUP call delivery procedure 713 uses a DN (Directory Number) 980552499035, where the prefix 9805 is an internal prefix applied to a telephone number to access the associated voice mail. In a manner similar to that discussed above for registration, a variant of this call flow could also be used by a primary telephone to access common Subscriber services ordinarily associated with the secondary telephone.

It is noted that the call flow illustrated in FIG. 7 may be extended in a straightforward way to handle common Subscriber services in general provided by suitable servers, and is not limited to voice mail.

As noted previously, the illustrations and examples herein are expressed in terms of cellular telephones communicating over a TDMA network and on a GSM network. The present invention, however, is not limited to this particular configuration, but can be applied to general mobile stations communicating over an arbitrary multiplicity of different networks utilizing general wireless technologies.

While the invention has been described with respect to a limited number of embodiments, it will be appreciated that many variations, modifications and other applications of the invention may be made.

The invention claimed is:

1. A first single-protocol mobile station operative over a first wireless single-protocol network having a Home Location Register (HLR) accommodating a configuration that includes a Calling Line Identity (CLI) that is associated with said first mobile station, wherein said HLR is configured to provide said first mobile station a new CLI, said new Calling Line Identity is associated with a second single-protocol mobile station, and wherein said second single-protocol mobile station is operative over a second wireless single-protocol network incompatible with said first wireless single-protocol network.

2. The first single-protocol mobile station according to claim 1, wherein said second single-protocol network is a GSM network and, wherein said first single-protocol is a TDMA network.

3. The first single-protocol mobile station according to claim 1 wherein said second mobile station has a configuration comprising an inherent telephone number, and wherein said new CLI is associated with the inherent telephone number of the second single-protocol mobile station.

4. The first single-protocol mobile station according to claim 3, wherein said first mobile station is a TDMA mobile station operating over a single protocol TDMA network and said second mobile station is a GSM mobile station operating over a single protocol GSM network.

5. The first single protocol mobile station of claim 1, wherein said second mobile station is further configured to have a CLI Directory Number and wherein said new Calling Line Identity (CLI) is associated with said second single-protocol mobile station by defining said new CLI as the CLI Directory Number of said second Mobile Station.

6. The first single-protocol mobile station according to claim 1 having a configuration for using said new CLI for accessing a common subscriber service, wherein said common subscriber service is accessible by said second single-protocol mobile station.

7. The first single-protocol mobile station according to claim 6 wherein said second single-protocol network is a GSM network and wherein said first single-protocol network is a TDMA network.

8. The first single-protocol mobile station of claim 6, wherein said second mobile station further has a configuration comprising a telephone number, and wherein said new CLI is associated with the telephone number of said second single-protocol mobile station.

9. The first single-protocol mobile station of claim 6, wherein said second mobile station further having a configuration comprising a CLI Directory Number and wherein said new Calling Line Identity (CLI) is associated with said second single-protocol mobile station by defining said CLI as the CLI Directory Number of said second Mobile Station.

10. The first single-protocol mobile station of claim 6, wherein said common subscriber service is selected from a group containing voice mail, voice mail notifications, e-mail, Internet access, caller ID, unified billing, voice-activated dialing, and virtual private network.

11. A method for wireless multi-protocol communication, comprising the steps of:
    (a) providing a first single-protocol mobile station operative over a first wireless single-protocol network having a Home Location Register (HLR) accommodating a configuration that includes a Calling Line Identity (CLI) associated with said first mobile station;
    (b) configuring said first mobile station for accessing a common subscriber service; and
    (c) configuring a second single-protocol mobile station to be operable over a second wireless single-protocol network incompatible with said first wireless single-protocol network and to access said common subscriber service; and
    (d) configuring said HLR to provide said first mobile station a new CLI, said new CLI is associated with said second single-protocol mobile station.

12. The method of claim 11, wherein said second single-protocol mobile station is associated with a telephone number, and wherein said new CLI of said first single-protocol mobile station is also associated with said telephone number.

13. The method of claim 11, wherein said second single-protocol mobile station further having a configuration comprising a CLI Directory Number and wherein said new Calling Line Identity, is associated with said second single-protocol mobile station by defining said CLI as the CLI Directory Number of said second Mobile Station.

14. The method of claim 11, wherein said common subscriber service is selected from a group containing voice mail, voice mail notifications, e-mail, Internet access, caller ID, unified billing, voice-activated dialing, and virtual private network.

15. A wireless multi-protocol communications system for use by a subscriber, the system comprising:
    (a) a plurality of incompatible wireless single-protocol networks;
    (b) a plurality of single-protocol mobile stations, such that for each of said wireless single-protocol networks there is at least one of said single-protocol mobile stations operative to communicating thereover; and
    (c) a common telephone number which is shared among at least two of said mobile stations which are operative to communicating over incompatible wireless single-protocol networks;
    wherein at least a first of said at least two mobile stations is operative over a first network having a Home Location Register (HLR) accommodating a configuration that includes a Calling Line Identity (CLI) associated with the first mobile station; said HLR is configured to comprise a new CLI, said CLI is associated with said common telephone number, thereby allowing the subscriber to utilize any of said at least two mobile stations to conduct communications according to said common telephone number.

16. A computer program operative to effecting the system of claim 15.

17. The wireless multi-protocol communications system of claim 15, further comprising:
(d) at least one common subscriber service which is shared among at least two of said mobile stations which are operative to communicating over incompatible wireless single-protocol networks;
wherein the subscriber can utilize any of said at least two mobile stations to access said at least one common subscriber service in a substantially identical fashion.

18. A computer program operative to effecting the system of claim 17.

19. The wireless multi-protocol communications system of claim 15, wherein one mobile station of said plurality of mobile stations is a primary telephone, and wherein, upon receiving an incoming call, the communications system initiates a first page for said primary telephone before initiating a page for any other telephone.

20. A computer program operative to effecting the system of claim 19.

21. The wireless multi-protocol communications system of claim 15, wherein one mobile station is a primary telephone, wherein another mobile station is a secondary telephone, and wherein, upon receiving an incoming call, the communications system initiates a first page for said primary telephone and simultaneously initiates a second page for said secondary telephone.

22. A computer program operative to effecting the system of claim 21.

23. The wireless multi-protocol communications system of claim 19, wherein one mobile station is a secondary telephone, wherein said secondary telephone is distinct from said primary telephone, and wherein upon receiving an incoming call, the communications system initiates a second page for said secondary telephone only upon failure of said first page.

24. A computer program operative to effecting the system of claim 23.

25. The wireless multi-protocol communications system of claim 15, wherein two mobile stations are operative to intercommunicating with one another.

26. A computer program operative to effecting the system of claim 25.

27. A wireless multi-protocol communications system for use by a subscriber, the system comprising:
(a) a plurality of incompatible wireless single-protocol networks;
(b) a plurality of single-protocol mobile stations, such that for each of said wireless single-protocol networks there is at least one of said single-protocol mobile stations operative to communicating thereover; and
(c) common subscriber service which is shared among at least two of said mobile stations which are operative to communicating over incompatible wireless single-protocol networks,
wherein at least a first of said at least two mobile stations is operative over a first network having a Home Location Register (HLR) accommodating a configuration that includes a Calling Line Identity (CLI) associated with the first mobile station; said HLR is configured to comprise a new CLI, said CLI is associated with said common telephone number, thereby allowing the subscriber to utilize any of said at least two mobile stations to access said common subscriber service in a substantially identical fashion.

28. A computer program operative to effecting the system of claim 27.

29. The wireless multi-protocol communications system of claim 27, wherein said common subscriber service is selected from a group containing voice mail, voice mail notifications, e-mail, Internet access, caller ID, unified billing, voice-activated dialing, and virtual private network.

30. A computer program operative to effecting the system of claim 29.

31. The wireless multi-protocol communications system of claim 27, wherein said at least one common subscriber service includes at least one service that is not available on all networks of said plurality of incompatible single-protocol networks.

32. A computer program operative to effecting the system of claim 31.

33. The wireless multi-protocol communications system of claim 27, wherein said mobile stations are operative to intercommunicating with one another.

34. A computer program operative to effecting the system of claim 33.

35. A method for terminating an incoming call to a common telephone number shared between a primary single-protocol mobile station and a secondary single-protocol mobile station; wherein the primary mobile station communicates over a first single-protocol network having a first gateway and a first switching center connected to a mobile number portability platform; wherein the secondary mobile station communicates over a second single-protocol network having a second gateway and a second switching center; wherein the primary mobile station has a first inherent telephone number and the secondary mobile station has a second inherent telephone number; and wherein a first call forwarding to the second inherent telephone number is associated with the primary mobile station; the method comprising the steps of:
(a) upon receiving the incoming call to the common telephone number, directing said incoming call to the second gateway;
(b) constructing a derivative telephone number which is an unambiguous function of the common telephone number;
(c) issuing a call delivery to the first gateway using said derivative telephone number;
(d) obtaining the recovered inherent telephone number of the primary mobile station from said derivative telephone number;
(e) issuing a call delivery to the first switching center using said recovered inherent telephone number of the primary mobile station;
(f) issuing a first page to the primary mobile station;
(g) upon failure of said first page, performing said first call forward to the second inherent telephone number via the mobile number portability platform;
(h) upon response from the mobile number portability platform that the second inherent telephone number does not exist within the first network, issuing a call delivery to the second gateway; and
(i) issuing a second page to the secondary mobile station.

36. A computer program operative to performing the method of claim 35.

37. The method of claim 35, wherein the common telephone number is the first inherent telephone number.

38. A computer program operative to performing the method of claim 37.

39. The method of claim 37, wherein said constructing a derivative telephone number affixes a prefix, and wherein said obtaining the recovered inherent telephone removes said prefix.

40. A computer program operative to performing the method of claim 39.

41. A method for registering a first single-protocol mobile station with a first single-protocol network; the mobile station having a Calling Line Identity (CLI) associated with an inherent telephone number; the network includes a switching center with a visitor location register and has a home location register configured to provide the mobile station with a new CLI associated with a common telephone number; said common telephone number is associated with a second single-protocol mobile station operative over a second wireless single-protocol network incompatible with said first single-protocol network; the method comprising the steps of:
- (a) issuing a registration of the mobile station with the visitor location register, using the inherent telephone number;
- (b) sending a Registration Notification to the home location register, using the inherent telephone number; and
- (c) returning a Registration Notification response to the visitor location register using the common telephone number.

42. A computer program operative to performing the method of claim 41.

43. The method of claim 41, wherein the mobile station is a secondary mobile station.

44. A computer program operative to performing the method of claim 43.

45. The method of claim 41, wherein the mobile station is a primary mobile station.

46. A computer program operative to performing the method of claim 45.

47. The method of claim 45, wherein the common telephone number is associated with a secondary single-protocol mobile station that is incompatible with the network.

48. A computer program operative to performing the method of claim 47.

49. A method for accessing common subscriber services associated with a common telephone number from a single-protocol mobile station communicating over a single-protocol network having a mobile switching center with a visitor location register; wherein the mobile station has an inherent telephone number distinct from the common telephone number; and wherein the network is operative to accessing a server providing such common subscriber services; the method comprising the steps of:
- (a) requesting access of common subscriber services and identifying the mobile station to the visitor location register according to the inherent telephone number;
- (b) relating the inherent telephone number to the common telephone number;
- (c) sending the common telephone number to the switching center; and
- (d) issuing a call delivery for the requested common subscriber services to the server,
- wherein said common telephone number is associated with a second single-protocol mobile station operating over a second wireless single-protocol network incompatible with said first single protocol network.

50. A computer program operative to performing the method of claim 49.

51. The method of claim 49, wherein the mobile station is a secondary mobile station.

52. A computer program operative to performing the method of claim 51.

53. The method of claim 51, wherein the common telephone number is associated with a primary single-protocol mobile station that is incompatible with the single-protocol network.

54. A computer program operative to performing the method of claim 53.

55. The method of claim 49, wherein the mobile station is a primary mobile station.

56. A computer program operative to performing the method of claim 55.

57. The method of claim 55, wherein the common telephone number is associated with a secondary single-protocol mobile station that is incompatible with the single-protocol network.

58. A computer program operative to performing the method of claim 57.

* * * * *